United States Patent [19]

Wilkeson

[11] Patent Number: 4,543,913

[45] Date of Patent: Oct. 1, 1985

[54] LIQUID DISPENSER AND GROOMING BRUSH FOR ANIMALS

[76] Inventor: Charles N. Wilkeson, 114 Colina Pl., Ormond Beach, Fla. 32074

[21] Appl. No.: 642,507

[22] Filed: Aug. 20, 1984

[51] Int. Cl.⁴ ............................................ A01K 13/00
[52] U.S. Cl. ...................................... 119/85; 132/114; 401/28
[58] Field of Search .................. 119/83, 85, 156–157; 132/112–114; 401/28, 279, 179, 181

[56] References Cited

U.S. PATENT DOCUMENTS

| | | | |
|---|---|---|---|
| 1,064,641 | 6/1913 | Halstead | 401/28 |
| 1,607,674 | 11/1926 | Ives | 132/114 |
| 2,379,330 | 6/1945 | Wilensky | 401/28 |
| 4,237,822 | 12/1980 | Kaiser, Jr. | 119/85 |
| 4,343,265 | 8/1982 | Belschner | 119/83 |

FOREIGN PATENT DOCUMENTS 515432  2/1955  Italy ...................................... 401/28

Primary Examiner—Jay N. Eskovitz
Attorney, Agent, or Firm—Lloyd F. Seebach

[57] ABSTRACT

The invention relates to a liquid dispenser and grooming brush for animals by which a free-flowing liquid can be applied to the skin of an animal, the liquid being contained in a chamber having a first plurality of generally flexible, solid members extending normally from the bottom wall thereof and arranged in spaced relation to each other for combing and separating the hair of the animal when the dispenser is urged toward the skin of the animal and is moved in either of two opposed directions and a second plurality of generally flexible, hollow members also extending normally from the bottom wall of the chamber and communicating therewith, the free ends of each plurality of members terminating in a common plane. Each member of the second plurality is provided with a self-sealing slit adjacent its free end, the slits being opened when the dispenser is moved in one of the two opposed directions with the free ends in contact with the skin of the animal and with a downwardly applied pressure to the dispenser that is sufficient to open the slits to emit the liquid. When the dispenser is moved in the other of the two opposed directions, the second plurality of members also serve to comb and separate the hair as well as spread or blend the emitted liquid over and into the skin.

6 Claims, 9 Drawing Figures

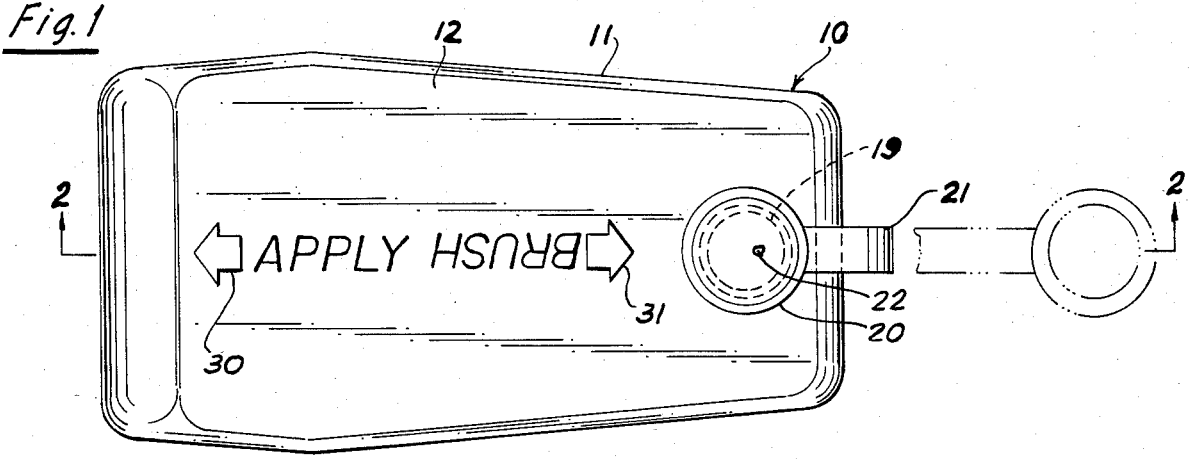
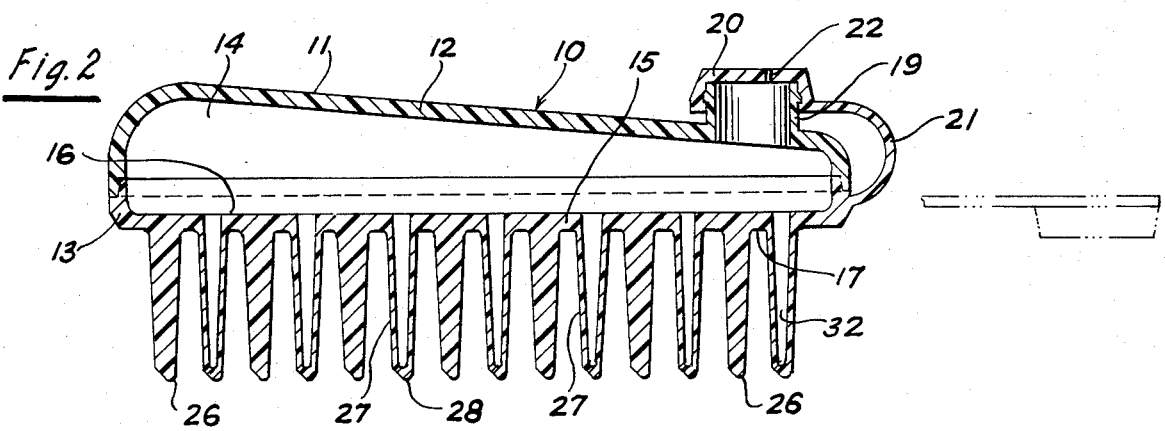
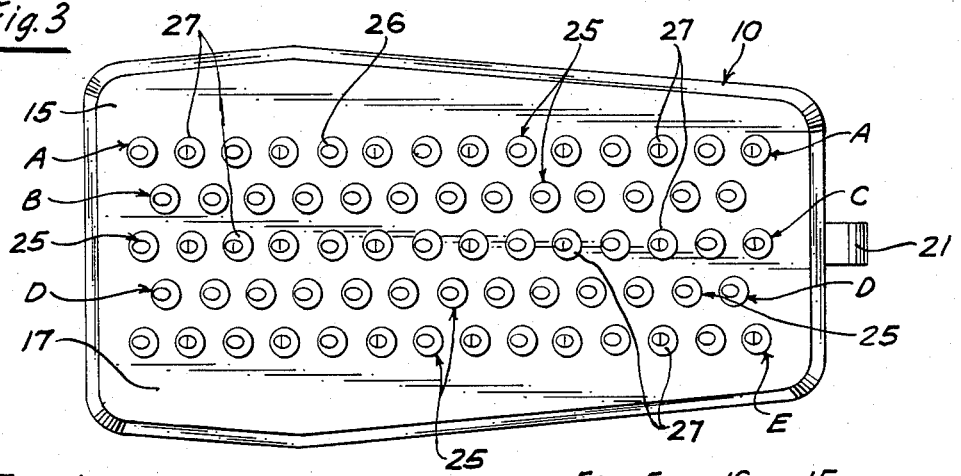
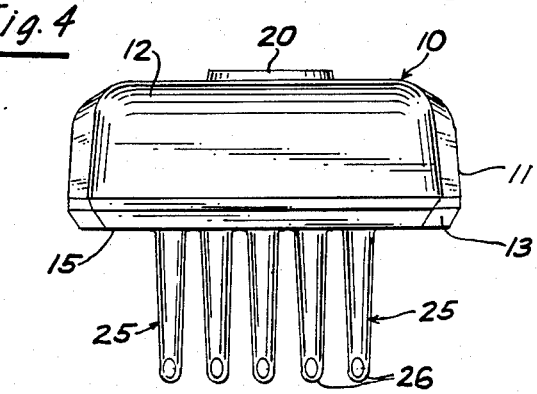
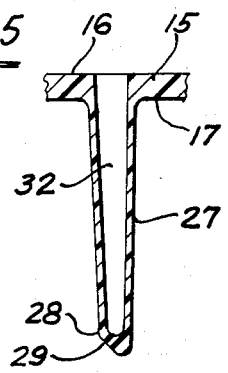

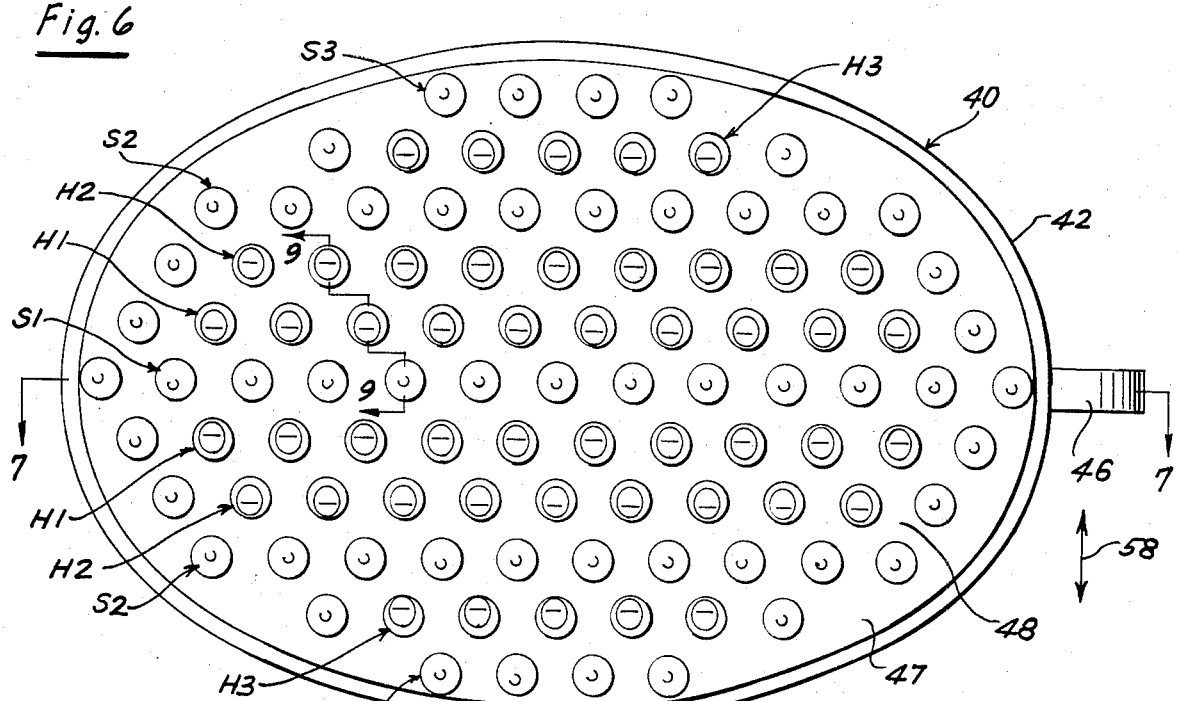

LIQUID DISPENSER AND GROOMING BRUSH FOR ANIMALS

FIELD OF THE INVENTION

The present invention relates to a liquid dispenser and grooming brush for animals by which the hair of an animal is combed and separated by a first plurality of members when the dispenser is moved in either of two opposed directions and maintained in contact with the skin of the animal and by which a free-flowing liquid, such as a medicated liquid for fleas, ticks, etc., is applied directly to the skin of the animal from the end of each of a second plurality of members when the dispenser is moved in one of the two opposed directions.

DESCRIPTION OF THE ART

The prior art discloses a number of devices by which a liquid or a powder can be dispensed therefrom for indirect application to the skin and particularly to the skin of a person. The application of the liquid or powder is directly to the hair, or onto the hair of the person so the application to the scalp can only be attained by massaging, brushing or combing of the hair. In the devices presently known, the liquid or powder is contained in a hollow housing and dispensed intermittently through one or more holes in the bottom plate of the device, the bottom plate, in some cases, being provided with a plurality of extending members which comb or separate the hair in order to allow the liquid or powder to reach the scalp. With such devices, the liquid or powder is not applied directly to the scalp through the extending members but through holes in the bottom wall of the housing and at a distance from the scalp that is dependent on the length of the extending members. If such members do not comb or separate the hair sufficiently, then the liquid or powder is merely applied to the hair and a very small portion of that actually applied finds its way to the scalp where it is meant to be applied in order to obtain the optimum benefit from the application and the most satisfactory results. Devices of this type are used for the application of liquid shampoos, medicated liquids and powders, etc., to the scalp of a person as well as for the application of various medications to the skin of animals, e.g., antiseptics, flea and tick repellants, etc. However none of the devices known apply the liquid or powder directly to the skin as in the present invention.

Another way in which such liquids, powders, medications, etc., are often applied is by aerosol dispensers. However, by this method a very fine mist reaches only the outermost portions of the hair with very little of the liquid, or even a powder, actually reaching the skin without massaging the scalp or working the liquid or powder into the hair until it ultimately finds its way to the scalp. When aerosol devices are used in proximity to the face of either a person or an animal there is always the danger and possibility of the spray getting into the eyes. While a person using an aerosol device would normally take precautions to protect the eyes, this same step presents a problem in many cases with respect to an animal. Again, the present invention precludes such possibilities as to animals and has proven to be most successful.

SUMMARY OF THE INVENTION

The object of the invention is to provide a liquid dispenser and grooming brush for animals by which a free-flowing liquid is applied directly to the skin of an animal through the free ends of a plurality of flexible, hollow members extending from one face of the dispenser when the latter is moved in one of two opposed directions.

Another object of the invention is to provide a liquid dispenser and grooming brush for animals by which a free-flowing liquid can be applied directly to the skin of an animal when a self-sealing slit at the free end of each of a plurality of members extending from the bottom wall of the dispenser and arranged in spaced relation to each other for combing and separating the hair of an animal is opened with movement of the dispenser in one of two opposed directions and with sufficient pressure applied to the dispenser to maintain the free ends of the members in contact with the skin.

Still another object of the invention is to provide a liquid dispenser and grooming brush for animals in which a free-flowing liquid is contained in a chamber having a first array of generally flexible, solid members normally extending from the bottom wall of the dispenser and arranged in spaced relation to each other for combing and separating the hair of an animal when the dispenser is moved in either of two opposed directions and maintained in contact with the skin of the animal, and a second array of generally flexible, hollow members communicating with the chamber, each member of the second array having a self-sealing slit adjacent its free end that is opened to dispense the liquid therethrough directly to the skin of the animal when the dispenser is moved in one of the two opposed directions with the free ends in contact with the skin of the animal.

These and other objects of the invention, as well as advantages, will be apparent to those skilled in the art by the description which follows and which is made in conjunction with the accompanying drawings.

Briefly, the objects of the invention are attained by a dispenser comprising a generally hollow shaped housing having a flat bottom wall, thereby defining a chamber in which a free-flowing liquid can be contained. The housing is made of a relatively soft plastic material and is, preferably, of a size and shape that can be readily grasped by a person's hand so the housing can be squeezed and easily handled as the dispenser is moved back and forth in two opposed directions for the purpose to be described and explained more fully hereinafter. A first array of generally flexible, solid members extend normally from the bottom wall of the dispenser in spaced relation to each other and have the free ends thereof terminating in a common plane for combing and separating the hair of an animal when the dispenser is moved in either of the two opposed directions. A second array of generally flexible, hollow members also extend normally from the bottom wall of the dispenser. These members of the second array are arranged in spaced relation to each other and to the members of the first array and communicate with the chamber. Hence, the liquid in the chamber is also prevalent in the hollow members and the free ends thereof terminate in the same common plane as the members of the first array. Each member of the second array is provided adjacent its free end with a self-sealing slit to contain the liquid. The members of the second array must be flexible to the extent that when downward pressure is applied to the dispenser to maintain the free ends of the members in contact with the skin of the animal as it is moved in one of the two opposed directions, the slits will open to permit the liquid to flow directly onto the skin of the animal and when the dispenser is moved in the other of the two opposed directions, the slits will close and the members will serve to comb or separate the hair and to massage or blend the applied liquid in conjunction with the members of the first array. As will be described in more detail hereinafter, the length of the members of the two arrays will be dependent on several factors. However, a dispenser in accordance with the invention and with the disclosure that follows is one of which the liquid is applied directly to the skin of an animal and with respect to substantially the full area encompassed by the two arrays of members.

DESCRIPTION OF THE DRAWINGS

Reference is now made to the accompanying drawings wherein like reference numerals designate like parts and wherein:

FIG. 1 is a plan view of a liquid dispenser and grooming brush for animals by which a free-flowing liquid can be applied to the skin of the animal and in which a preferred embodiment of the invention is incorporated;

FIG. 2 is a vertical sectional view of the liquid dispenser and grooming brush disclosed in FIG. 1 and is taken substantially along line 2—2 of FIG. 1;

FIG. 3 is a bottom view of the liquid dispenser and grooming brush disclosed in FIG. 1 and showing the spaced arrangement of the first and second arrays of members;

FIG. 4 is a left end view of the liquid dispenser and grooming brush disclosed in FIG. 1;

FIG. 5 is an enlarged vertical sectional view through one of the hollow members of the second array showing the slit adjacent the free end of each such member;

FIG. 6 is a bottom view of another embodiment of a liquid dispenser and grooming brush incorporating the invention and showing an arrangement of the first and second arrays of member whereby application or dispensing of the liquid can be attained with movement of the dispenser in both of the two opposed directions;

FIG. 7 is a vertical sectional view of the liquid dispenser and grooming brush disclosed in FIG. 6 and taken substantially along line 7—7 of FIG. 6;

FIG. 8 is an end view of the liquid dispenser and grooming brush disclosed in FIG. 6 with certain solid members omitted to show the arrangement and relation of the rows of the first array (solid members) and of the second array (hollow members); and FIG. 9 is an enlarged sectional view of several of the solid and hollow members comprising the two arrays, taken substantially along line 9—9 of FIG. 6.

DESCRIPTION OF PREFERRED EMBODIMENTS

With reference to the accompanying drawings, a liquid dispenser and grooming brush embodying the invention for applying a free-flowing liquid to the skin of an animal is generally designated by the numeral 10. As shown particularly in FIG. 2, such a dispenser 10 includes a housing 11 comprising an upper shell 12 and a lower shell 13 which, when assembled and bonded together to form a unitary structure, provide a chamber 14 in which a free-flowing liquid can be contained. The lower shell 13 has a bottom wall 15 comprising an inner surface 16 and an outer surface 17. The upper shell 12 is provided with a hollow, cylindrical extension 19 that communicates with the chamber 14 and through which the liquid can be introduced into the chamber. The extension 19 is normally closed by a suitable snap cap 20 that is integral with one end of a strap 21 having its other end integral with the lower shell 13. The cap 20 can be provided with a small vent or breather hole 22, if necessary. As will be apparent from the description thus far, and also from FIGS. 1–4, the dispenser 10 can be easily hand manipulated because the size and shape is such that it can be easily grasped.

The bottom wall 15 has a first array of solid members 25 that extend normally therefrom. Each member 25 has a generally truncated free end 26, all of which face in the same direction, see FIG. 2. The free ends of the members 25 also terminate in a common plane, the members per se being arranged in spaced relation to each other, as seen in FIG. 3.

The bottom wall 15 also has a second array of hollow members 27 that extend normally therefrom and communicate with the chamber 14. The members 27 have a generally truncated free end 28, each of which terminates in the same common plane as the free ends 26 of the members 25. A slit 29 is provided adjacent the free end 28 of each of the members 27, see FIG. 5. The members 27 are also arranged in spaced relation to each other and to the solid member 25. With particular reference to FIG. 3, the rows A, C, and E can comprise an alternate arrangement of the members of the first array 25 and of the second array of hollow members 27, whereas the rows B and D comprise only the solid members of the first array 25. Further, the slits 29 in the members 27 must face in the direction indicated by the arrow 30 shown in FIG. 1.

At this point, to best understand the invention, the materials and forms of the different elements are described in more detail. The upper and lower shells 12 and 13 are, preferably, made of a soft plastic material, soft rubber, etc., so at least the upper shell 12 can be readily squeezed by hand to enhance the flow of the liquid through the slits 29, as later described. The bottom wall 15 should be sufficiently rigid so squeezing of the upper shell 12 does not wrap or bend the bottom wall 15 so as to raise some of the members 25 and 27 out of their common plane. The upper and lower shells 12 and 13 can be separately formed and then assembled to form the chamber 14 with a liquid seal being provided therebetween by a suitable adhesive or other means.

The members 25 and 27 are of the same material as the upper and lower shells 12 and 13 and should be generally flexible so as to comb and separate the hair in the case of the solid members 25 when the dispenser 10 is moved in either of two directions, as indicated by the arrows 30 and 31 on the upper shell 12, see FIG. 1. As shown in FIG. 5, the members 27 are hollow and communicate or connect with the chamber 14 via the cavity 32. As a result, it can be said that the liquid is prevalent in each of the members 27 as well as in the chamber 14.

Preferably, the members 25 and 27 can be conical in shape, as shown in FIG. 5, and can be formed or molded integral with the bottom wall 15. The members 25 and 27 are of the same length and the actual length will be dependent on the intended use, as described more fully hereinafter. Accordingly, the free ends 26 and 28 of the members 25 and 27, respectively, establish a common plane. Primarily, the dispenser 10 is intended to be used for applying a liquid, such as, a skin medication, a flea or tick medication, etc., directly to the skin of an animal. Accordingly, the solid members 25 must be sufficiently long and sufficiently flexible, yet sufficiently rigid, to comb and separate the hair and at the same time move through the hair with the free ends 26 in contact with the skin. Further, the rigidity of the hollow members 27 must be such that with the free ends 28 thereof in contact with the skin of the animal and with downward pressure applied to the dispenser 10, the free ends 28 will drag to such an extent, when the dispenser 10 is moved in the direction indicated by arrow 30, see FIG. 1, that the slits 29 will open, thereby permitting the liquid to flow out of slits 29 directly onto the skin.

When the dispenser 10 is used for applying a skin medication, flea or tick medication, etc., to the skin of an animal, the length of the members 25 and 27 will be dependent on the type and the length of the hair of the animal. For example, the length of the members 25 and 27 on a dispenser for applying a liquid medication to the skin of a long-haired dog, such as a collie, would be longer than those of a dispenser used for a short-haired dog, such as a beagle. Nevertheless, the function of the members 25 and 27 will be the same, that is, as the dispenser 10 is moved in one of the two opposed directions with downwardly applied pressure so as to maintain the free ends 26 and 28 in contact with the skin, the members 25 which precede and follow the members 27 will comb and separate the hair and the slits 29 will open. The liquid will then flow directly onto the skin to be massaged and blended into the skin by the following members 25. However, when the dispenser 10 is moved in the other of the two opposed directions, both the members 25 and 27 will comb and separate the hair as well as massage and blend the liquid into the skin. The action of the first and second arrays of members 25 and 27 can be made to function in the same manner, that is, by reversing the facing direction of the slits 29 in the truncated free ends 28 of alternate members 27, then the liquid will be emitted with movement of the dispenser 10 in either of the two opposed directions, as well as combing and separating the hair in either of the two opposed directions. This type of action is necessary because with some animals that have very short, coarse hair combing of the hair can be accomplished only with movement of the comb, or in this case with movement of the dispenser in only one direction but the direction on one side of the animal is opposed to that on the other side.

With reference to FIGS. 6–9, there is disclosed a liquid dispenser and grooming brush that is particularly adapted to the type of animal just described hereinabove; namely, a horse, a pony, etc. As is well known, a horse is usually currycombed from the head toward the shoulder, from the shoulder to the back toward the rump, etc., but always combed in only the one direction and not reversed in direction because of the hair formation. Consequently, the combing directions must be in opposed directions and in accordance with the side of the animal facing the comber and for this reason, another embodiment of the invention is disclosed in FIGS. 6–9 which will accomplish this result and function in its normal fashion.

The dispenser shown in FIGS. 6–9 and generally designated by the numeral 40 comprises an upper shell 41 and a lower shell 42 which, when bonded together as previously described, form a chamber 43 for containing a free-flowing liquid. A hollow, cylindrical extension 44 is provided at one end of the chamber and is utilized to pour the liquid into the chamber. The extension is normally covered with a snap cap 45 which is carried integral with one end of a strap 46 having its other end integral with the lower shell 42, as seen in FIG. 7.

The lower shell 42 has a bottom wall 47 with an inner surface 48 and an outer surface 49. From the outer surface 49 of the wall 47, a first array 50 of solid members 51 extend normally therefrom in spaced relation to each other and a second array 52 of hollow members 53 also extend normally therefrom in spaced relation to each other and to the members 51 of the first array 50. The members 51 and 53 are generally flexible with the members 53 having a cavity 54 that communicates with the chamber 43. The free ends 55, 56 of the members 51 and 53, respectively, are truncated and terminate in a common plane. The members 53 are provided adjacent their free end with a slit 57 through which the liquid flows onto the skin of the animal in much the same manner as described with respect to FIGS. 1–5.

Since the dispenser 40 is to be used to apply a free-flowing liquid to the skin of an animal, such as a horse, and, as described above, the dispenser 40 can be moved in only one direction to apply the liquid, the first and second arrays 50 and 52 must of necessity be arranged to apply the liquid as the dispenser is moved in either of two opposed directions depending on the side of the animal that is being groomed.

With particular reference to FIG. 6, the first array 50 of members 51 comprises a common central group S1 of members 51 that extend from the bottom wall 47 in a row or line normal to the two opposed directions of movement of the dispenser, as shown by the double-headed arrow 58, and at least two rows S2 and S3 of members 51 that are spaced from and extend in lines or rows parallel to and on each side of the group S1. The second array 52 of the members 53 are arranged in spaced rows or lines H1 and H2 parallel to and on both sides of the common group S1 and between the rows S2 and S3. Also, to provide the best combing and grooming action, a solid member 51 should terminate each end of a row. A third row or line H3 of members 53 is arranged parallel to and between rows S2 and S3. The slit 57 in each of the members 52 in rows H1 and H2 face away from each other and in rows H3 the slits 57 face toward each other. Hence, with movement of the dispenser 50 in either of the two directions, three rows of members 52 will emit the liquid and the other three rows together with the rows of solid members 51 will comb and separate the hair, the action alternating with the side of the animal on which the dispenser is being used. In the embodiment disclosed in FIGS. 6–9, the function of the members 51 and 53 is no different than with respect to members 25 and 27, as described with reference to FIGS. 1–5, that is, in both of the two opposed directions, the solid members comb and separate the hair and in only one of the two opposed directions will the hollow members emit the liquid depending on the facing direction of the slits.

The upper shell 41 can be provided with a lug 60 on each side thereof, as shown in FIG. 8, for receiving the slotted ends of a hand strap 61 under which a hand is positioned in grasping the dispenser to insure easier handling and manipulation of the dispenser.

While the free ends 26, 28, 55 and 56 of the members 25, 27, 51 and 53, respectively, are shown and described as being truncated, it will be understood by those skilled in the art that not only the shape of the free ends but also the size and shape of the members per se can be altered or changed without departing from the spirit of the invention. Also, the pattern of the arrays of the solid and hollow members can be altered without affecting the function and purpose of such members.

Accordingly, this invention has been described in detail with particular reference to preferred embodiments thereof, but it will be understood that variations and modifications can be effected within the spirit of the invention.

I claim:

1. A brush-type dispenser for applying a plurality of streams of a free-flowing liquid between the hairs of and directly to the skin of an animal when the dispenser is moved in at least one of two opposed directions, comprising in combination:

a generally flexible housing having a flat, bottom wall including an inner and an outer surface and defining a hollow, resilient chamber in which the liquid is contained;

a first array of a plurality of generally flexible, solid members arranged in spaced relation along spaced rows parallel to the directions of movement of the dispenser, each member of the first array extending normally from the bottom wall and having a free end terminating in a common flat plane for combing and separating the hair of the animal as the dispenser is moved in either of the two opposed directions with sufficient pressure applied thereto to maintain the free ends of the members in contact with the skin of the animal; and a second array of a plurality of generally flexible, hollow members arranged in spaced relation to each other between and in alternate rows of the members of the first array, each member of the second array extending normally from the bottom wall, communicating with the chamber and having a free end terminating in the common plane, each free end being provided with a self-sealing slit facing one of the two opposed directions for normally retaining the liquid in the chamber and being opened for dispensing the liquid in a stream only when the dispenser is moved in the one of the two opposed directions that is in accordance with the facing direction of the slits and with sufficient pressure applied thereto to maintain the free ends of the members of both arrays in contact with the skin of the animal and for combing and separating the hair of animal when the dispenser is moved in the other of the two opposed directions.

2. A brush-type dispenser in accordance with claim 1 wherein members of the first array precede members of the second array in the direction of movement of the dispenser for applying the liquid to the skin of the animal.

3. A brush-type dispenser in accordance with claim 1 wherein the first and second arrays of members are arranged in rows in the direction of the two opposed directions, alternate rows comprising members of the first and second arrays arranged in spaced relation and only members of the first array arranged in spaced relation.

4. A brush-type dispenser in accordance with claim 1 wherein the slits in the free ends of the alternate members of the second array face each other for applying the liquid to the skin of the animal when the dispenser is moved in either of the two opposed directions.

5. A brush-type dispenser in accordance with claim 1 wherein the first array of members comprises a common central group of members extending normal to the two opposed directions of movement of the dispenser and at least two rows of members spaced from and extending parallel to each side of the common central group, the members of the second array being arranged in at least two spaced, parallel rows on both sides of the common central group of members and having the slits thereof in each row alternately facing one of the two opposed directions of movement for selectively dispensing the liquid in a plurality of streams from only one row of members of the second array on each side of the common central group when the dispenser is moved in either of the two opposed directions with sufficient pressure applied thereto to maintain the free ends of the members of both arrays in contact with the skin of the animal so the members of first array and remaining members of the second array comb and separate the hair of the animal.

6. A brush-type dispenser in accordance with claim 5 wherein the slits in the members of the second array on one side of the common central group of members of the first array face in one of the two opposed directions of movement of the dispenser and the slits in the members of the second array on the other side of the common central group of the first array face in the other of the two opposed directions of movement of movement of the dispenser for selectively dispensing the liquid in a plurality of streams and combing and separating the hair of the animal in accordance with the direction in which the dispenser is moved.

* * * * *